US012661785B2

(12) United States Patent
Zhou et al.

(10) Patent No.: US 12,661,785 B2
(45) Date of Patent: Jun. 23, 2026

(54) ROBOT CONTROL METHOD AND APPARATUS, ROBOT, AND STORAGE MEDIUM

(71) Applicant: TENCENT TECHNOLOGY (SHENZHEN) COMPANY LIMITED, Shenzhen (CN)

(72) Inventors: Cheng Zhou, Shenzhen (CN); Yu Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 129 days.

(21) Appl. No.: 18/429,595

(22) Filed: Feb. 1, 2024

(65) Prior Publication Data

US 2024/0173862 A1     May 30, 2024

Related U.S. Application Data

(63) Continuation of application No. PCT/CN2023/118082, filed on Sep. 11, 2023.

(30) Foreign Application Priority Data

Oct. 31, 2022     (CN) .......................... 202211348498.1

(51) Int. Cl.
*B25J 9/16*          (2006.01)
*B25J 9/04*          (2006.01)
(52) U.S. Cl.
CPC .............. *B25J 9/1664* (2013.01); *B25J 9/04* (2013.01); *B25J 9/1669* (2013.01)

(58) Field of Classification Search
CPC . B25J 9/1664; B25J 9/04; B25J 9/1669; B25J 9/1612; B25J 9/1602;
(Continued)

(56) References Cited

U.S. PATENT DOCUMENTS 9,827,670 B1 * 11/2017 Strauss .................. B25J 9/0009
10,131,051 B1    11/2018 Goyal et al.
(Continued)

FOREIGN PATENT DOCUMENTS

CN          107414825 A     12/2017
CN          207669311 U      7/2018
(Continued)

OTHER PUBLICATIONS

China National Intellectual Property Administration (CNIPA) Office Action 1 for Application No. 202211348498.1 Mar. 19, 2025 12 Pages (including translation).
(Continued)

*Primary Examiner* — Kira Nguyen
(74) *Attorney, Agent, or Firm* — Anova Law Group, PLLC

(57)          ABSTRACT
A robot control method includes: controlling an end effector of the robot to collide with a target object in a process of the end effector moving to the target object; controlling the end effector to rotate relative to the target object, to adjust the target object to a target pose corresponding to a pick-up action; and controlling the end effector to pick up the target object after the target object is adjusted to the target pose; wherein the end effector is in motion during an entire phase from the end effector colliding with the target object to picking up the target object.

18 Claims, 6 Drawing Sheets

(a) Approach phase     (b) Collision phase     (c) Rotation phase     (d1) Non-grasping type pick-up phase     (d2) Grasping type pick-up phase

(58) Field of Classification Search

CPC ........... G05B 2219/39471; G05B 2219/39476; G05B 2219/39483; G05B 2219/39484; G05B 2219/40053

USPC ........................................................ 700/245

See application file for complete search history.

(56) References Cited

U.S. PATENT DOCUMENTS

| | | | |
|---|---|---|---|
| 2012/0072022 A1 | 3/2012 | Kim et al. | |
| 2013/0184870 A1* | 7/2013 | Ota | B25J 9/1669 |
| | | | 700/262 |
| 2017/0274539 A1* | 9/2017 | Maeda | B25J 15/10 |
| 2020/0114508 A1 | 4/2020 | Kawabata et al. | |
| 2021/0122039 A1* | 4/2021 | Su | B25J 9/163 |
| 2021/0146532 A1 | 5/2021 | Rodriguez et al. | |
| 2021/0245365 A1 | 8/2021 | Sugahara et al. | |
| 2021/0291366 A1* | 9/2021 | Eto | B25J 9/1664 |
| 2022/0297294 A1* | 9/2022 | Baek | B25J 9/1687 |
| 2025/0170718 A1* | 5/2025 | Isobe | B25J 9/1612 |

FOREIGN PATENT DOCUMENTS

| | | | |
|---|---|---|---|
| CN | 110636924 A | 12/2019 | |
| CN | 111015655 A | 4/2020 | |
| CN | 111225554 A | 6/2020 | |
| CN | 113246139 A | 8/2021 | |
| CN | 115194771 A | 10/2022 | |
| CN | 115958587 A | 4/2023 | |
| EP | 1340700 A1 | 9/2003 | |
| JP | 2022155623 A | 10/2022 | |

OTHER PUBLICATIONS

Fabio Ruggiero et al., "Nonprehensile dynamic manipulation: A survey." IEEE Robotics and Automation Letters 3.3 (2018): 1711-1718.

Kevin M. Lynch et al. "The roles of shape and motion in dynamic manipulation: The butterfly example." Proceedings. 1998 IEEE International Conference on Robotics and Automation (Cat. No. 98CH36146). vol. 3. IEEE, 1998. pp. 1958-1963.

Matthew T. Mason et al., "Dynamic manipulation." Proceedings of 1993 IEEE/RSJ International Conference on Intelligent Robots and Systems (IROS'93). vol. 1. IEEE, 1993. pp. 152-159.

Raymond R. Ma et al., "On dexterity and dexterous manipulation." 2011 15th International Conference on Advanced Robotics (ICAR). IEEE, 2011. pp. 1-7.

Aude Billard et al., "Trends and challenges in robot manipulation." Science 364.6446 (2019): eaat8414.

Jochen Stuber et al., "Let's push things forward: A survey on robot pushing." Frontiers in Robotics and AI 7 (2020): 8.

Diana Serra et al. "Control of nonprehensile planar rolling manipulation: A passivity-based approach." IEEE Transactions on Robotics 35.2 (2019): 317-329.

Hitoshi Arisumi et al., "Casting manipulation—Midair control of a gripper by impulsive force." IEEE transactions on robotics 24.2 (2008): 402-415.

J. Zachary Woodruff et al., "Planning and control for dynamic, nonprehensile, and hybrid manipulation tasks." 2017 IEEE International Conference on Robotics and Automation (ICRA). IEEE, 2017. pp. 4066-4073.

Hitoshi Arisumi et al., "Whole-body motion of a humanoid robot for passing through a door-opening a door by impulsive force." 2009 IEEE/RSJ International Conference on Intelligent Robots and Systems. IEEE, 2009. pp. 428-434.

Thomas Wimbock et al. "Comparison of object-level grasp controllers for dynamic dexterous manipulation." The International Journal of Robotics Research 31.1 (2012): 3-23.

Cheng Zhou et al. "Topp-mpc-based dual-arm dynamic collaborative manipulation for multi-object nonprehensile transportation." 2022 International Conference on Robotics and Automation (ICRA). IEEE, 2022. pp. 999-1005.

Seyed Sina Mirrazavi Salehian et al., "A dynamical system approach for catching softly a flying object: Theory and experiment." IEEE Transactions on Robotics 32.2 (2016): 462-471.

Maksim Surov et al. "Case study in non-prehensile manipulation: planning and orbital stabilization of one-directional rollings for the "Butterfly" robot." 2015 IEEE international conference on Robotics and Automation (ICRA). IEEE, 2015. pp. 1484-1489.

Filippo Bertoncelli et al., "Linear time-varying MPC for nonprehensile object manipulation with a nonholonomic mobile robot." 2020 IEEE international conference on robotics and automation (ICRA). IEEE, 2020. pp. 11032-11038.

Aaron M. Johnson et al., "A hybrid systems model for simple manipulation and self-manipulation systems." The International Journal of Robotics Research 35.11 (2016): 1354-1392.

Feng Zhu et al., "Optimal control of hybrid switched systems: A brief survey." Discrete Event Dynamic Systems 25 (2015): 345-364.

He Li et al., "Hybrid systems differential dynamic programming for whole-body motion planning of legged robots." IEEE Robotics and Automation Letters 5.4 (2020): 5448-5455.

Neel Doshi et al., "Hybrid differential dynamic programming for planar manipulation primitives." 2020 IEEE International Conference on Robotics and Automation (ICRA). IEEE, 2020. pp. 6759-6765.

Anil V Rao "A survey of numerical methods for optimal control." Advances in the astronautical Sciences 135.1 (2009): 497-528.

Yuval Tassa et al., "Control-limited differential dynamic programming." 2014 IEEE International Conference on Robotics and Automation (ICRA). IEEE, 2014. pp. 1168-1175.

Yunpeng Pan et al., "Probabilistic differential dynamic programming." Advances in Neural Information Processing Systems 27 (2014).

Zhaoming Xie et al., "Differential dynamic programming with nonlinear constraints." 2017 IEEE International Conference on Robotics and Automation (ICRA). IEEE, 2017. pp. 695-702.

Rohan Budhiraja et al. "Differential dynamic programming for multi-phase rigid contact dynamics." 2018 IEEE—RAS 18th International Conference on Humanoid Robots (Humanoids). IEEE, 2018. pp. 1-9.

Wilson Jallet et al. "Constrained differential dynamic programming: A primal-dual augmented lagrangian approach." 2022 IEEE/RSJ International Conference on Intelligent Robots and Systems (IROS). IEEE, 2022.

Wilson Jallet et al. "ProxNLP: a primal-dual augmented Lagrangian solver for nonlinear programming in Robotics and beyond." arXiv preprint arXiv:2210.02109 (2022).

Etienne Pellegrini et al., "A multiple-shooting differential dynamic programming algorithm." AAS/AIAA Space Flight Mechanics Meeting. vol. 2. 2017.

Xiaobo Zheng et al., "Constrained trajectory optimization with flexible final time for autonomous vehicles." IEEE Transactions on Aerospace and Electronic Systems 58.3 (2021): 1818-1829.

Brian Plancher et al., "A performance analysis of parallel differential dynamic programming on a gpu." Algorithmic Foundations of Robotics XIII: Proceedings of the 13th Workshop on the Algorithmic Foundations of Robotics 13. Springer International Publishing, 2020. pp. 656-672.

R. Goebel et al., "Hybrid dynamical systems," IEEE control systems magazine, vol. 29, No. 2, pp. 28-93, 2009.

Yan-Bin Jia et al., "Batting an in-flight object to the target." The International Journal of Robotics Research 38.4 (2019): 451-485.

Cheng Zhou et al., "Optimal nonprehensile interception strategy for objects in flight." 2022 IEEE/RSJ International Conference on Intelligent Robots and Systems (IROS). IEEE, 2022.

The World Intellectual Property Organization (WIPO) International Search Report for PCT/CN2023/118082 Dec. 9, 2023 7 Pages (including translation).

* cited by examiner

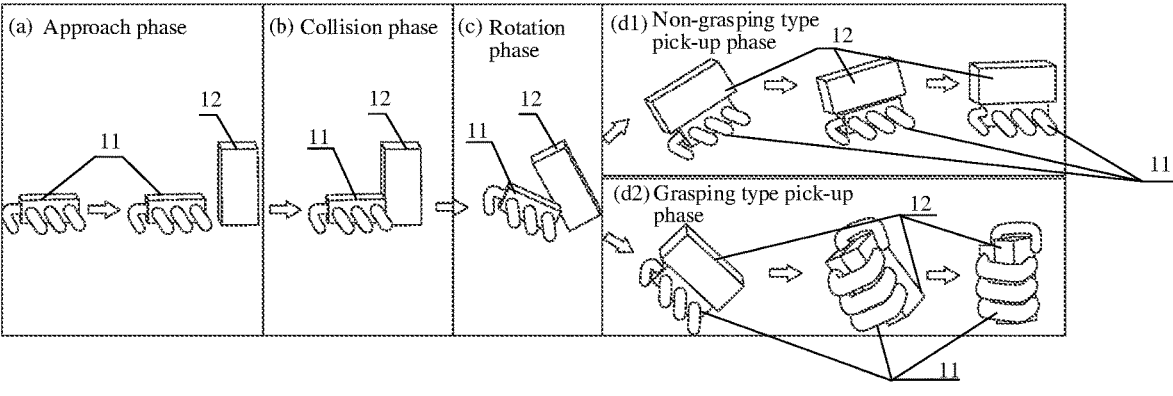

| (a) Approach phase | (b) Collision phase | (c) Rotation phase | (d1) Non-grasping type pick-up phase |
| | | | (d2) Grasping type pick-up phase |

FIG. 1

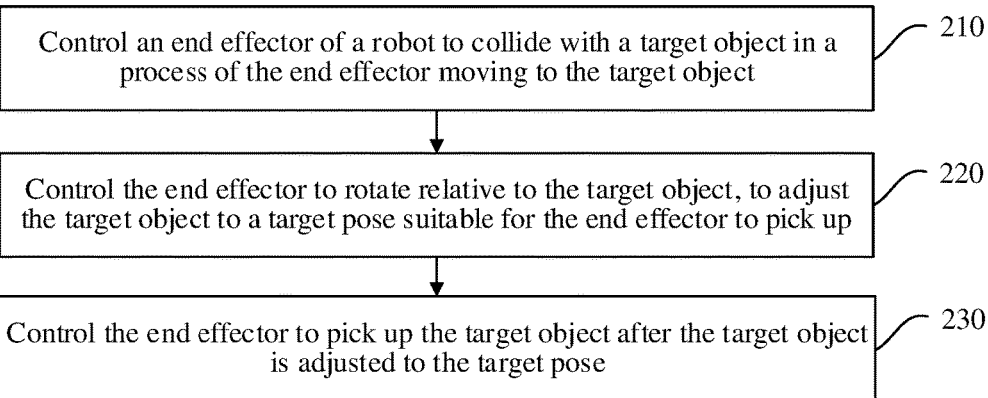

Control an end effector of a robot to collide with a target object in a process of the end effector moving to the target object — 210

Control the end effector to rotate relative to the target object, to adjust the target object to a target pose suitable for the end effector to pick up — 220

Control the end effector to pick up the target object after the target object is adjusted to the target pose — 230

FIG. 2

Policy one, low velocity (a)

Policy one, low velocity (b)

Policy one, high velocity (c)

Policy one, high velocity (d)

Policy two, low velocity  (a)

Policy two, low velocity  (b)

Policy two, high velocity (c)

Policy two, high velocity    (d)

(a)                    (b)                    (c)                    (d)

(a)                    (b)                    (c)                    (d)

900

Collision control module 910

Rotation control module 920

Pick-up control module 930

ROBOT CONTROL METHOD AND APPARATUS, ROBOT, AND STORAGE MEDIUM

CROSS-REFERENCES TO RELATED APPLICATIONS

This application is a continuation application of PCT Patent Application No. PCT/CN2023/118082, filed on Sep. 11, 2023, which claims priority to Chinese Patent Application No. 202211348498.1, entitled "ROBOT CONTROL METHOD AND APPARATUS, ROBOT, AND STORAGE MEDIUM" filed with the China National Intellectual Property Administration on Oct. 31, 2022, the entire contents of both of which are incorporated herein by reference.

FIELD OF THE TECHNOLOGY

Embodiments of the present disclosure relate to the field of robotics and automatic control technologies, and in particular, to a robot control method and apparatus, a robot, and a storage medium.

BACKGROUND OF THE DISCLOSURE

A robot is an automatic control machine that mimics human actions, and the part of the robot that acts like human hands is called an end effector.

In the related art, the end effector stops moving after arriving to a position very close to a target object, grabs the target object and then starts moving again. That is, the end effector grabs the target object in a static manner. However, in the related art, the end effector needs to reduce its speed to zero before it can grab the object, which takes a long time, resulting in a low control efficiency of the robot in grabbing the target object.

SUMMARY

The embodiments of the present disclosure provide a robot control method and apparatus, a robot, and a storage medium, which enables the robot to dynamically pick up objects, thereby improving the control efficiency of the robot in picking up objects. The technical solutions are as follows:

According to an aspect of the present disclosure, a robot control method is provided. The method includes: controlling an end effector of the robot to collide with a target object in a process of the end effector moving to the target object; controlling the end effector to rotate relative to the target object, to adjust the target object to a target pose corresponding to a pick-up action; and controlling the end effector to pick up the target object after the target object is adjusted to the target pose; wherein the end effector is in motion during an entire phase from the end effector colliding with the target object to picking up the target object.

According to an aspect of the present disclosure, a robot control apparatus is provided. The apparatus includes: a collision control module, configured to control an end effector of a robot to collide with a target object in a process of the end effector moving to the target object; a rotation control module, configured to control the end effector to rotate relative to the target object, to adjust the target object to a target pose suitable for the end effector to pick up; and a pick-up control module, configured to control the end effector to pick up the target object after the target object is adjusted to the target pose; where the end effector is in motion during an entire phase from the end effector colliding with the target object to the end effector picking up the target object.

According to an aspect of the present disclosure, a robot is provided. The robot includes a processor and a memory, the memory storing a computer program, the computer program being loaded and executed by the processor to implement the foregoing robot control method.

According to an aspect of the present disclosure, an end effector of a robot is provided. The end effector is configured to collide with a target object in a process of the end effector moving to the target object; the end effector is further configured to rotate relative to the target object after colliding with the target object to adjust the target object to a target pose suitable for the end effector to pick up; and the end effector is further configured to pick up the target object after the target object is adjusted to the target pose; where the end effector is in motion during an entire phase from the end effector colliding with the target object to the end effector picking up the target object.

According to an aspect of the present disclosure, a non-transitory computer-readable storage medium is provided, the computer-readable storage medium storing a computer program, the computer program being loaded and executed by the processor to implement the foregoing robot control method.

The technical solution provided by the embodiments of the present disclosure may include the following beneficial effects:

The end effector of the robot is controlled to move to the target object and collide with the target object in the moving process, such that the end effector rotates relative to the target object until the target object is adjusted to the target pose, and then the end effector is controlled to pick up the target object. The end effector is in motion during the pick-up process. The end effector does not need to reduce its speed to 0 and can pick up the target object in the motion state, realizing dynamic object pick-up. This saves the time required for picking up the object, thereby improving the control efficiency of the robot in picking up the object.

It is to be understood that, the foregoing general descriptions and the following detailed descriptions are merely for illustration and explanation purposes and are not intended to limit the present disclosure.

BRIEF DESCRIPTION OF THE DRAWINGS

FIG. 1 is a schematic diagram of a robot control method according to an embodiment of the present disclosure;

FIG. 2 is a flowchart of a robot control method according to an embodiment of the present disclosure;

DESCRIPTION OF EMBODIMENTS

Figures 3, 4:
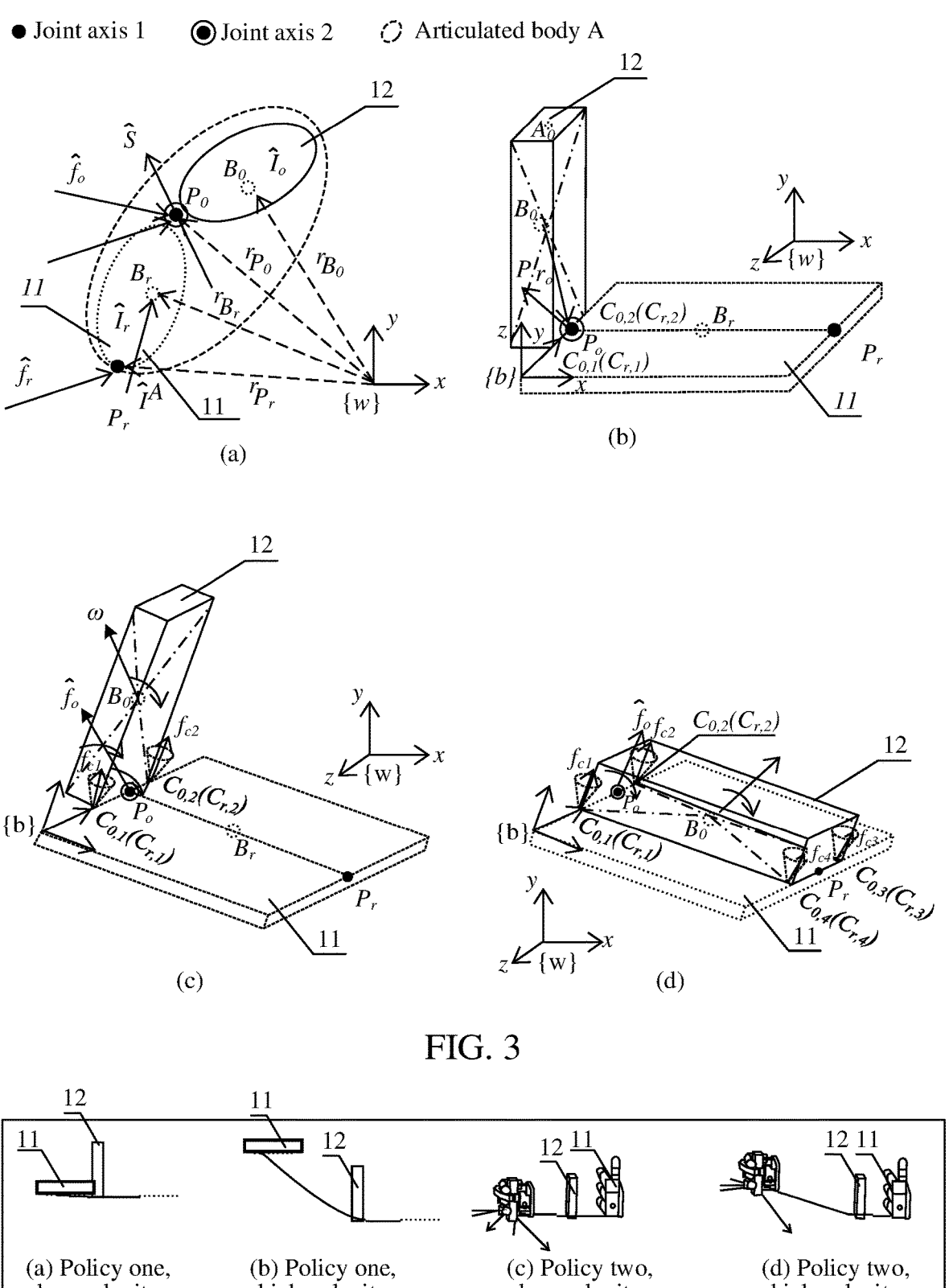
FIG. 3 is a schematic diagram of a robot control method according to another embodiment of the present disclosure.
FIG. 4 is a schematic diagram of a robot control method according to another embodiment of the present disclosure.

As shown in FIG. 1, the robot control method provided by the embodiments of the present disclosure includes the following parts:

Approach: As shown in FIG. 1(*a*), an end effector 11 of a robot moves towards a target object 12 to approach the target object 12 before touching the target object 12.

Collision: As shown in FIG. 1(*b*), the end effector 11 collides with the target object 12 as a result of constantly approaching the target object 12.

Rotation: As shown in FIG. 1(*c*), after the end effector 11 collides with the target object 12, there is relative rotation between the end effector 11 and the target object 12 around a contact position of the two, and the angle between the two gradually becomes smaller.

Pick up: The angle between the end effector 11 and the target object 12 changes to 0 with rotation, indicating that the end effector 11 has picked up the target object 12. The pick up may be non-grasping type pick up as shown in FIG. 1(*d*1); that is, the end effector 11 and the target object 12 remain relatively stationary through only one contact surface, and a finger part of the end effector 11 does not participate in limiting the displacement of the target object 12. The pick up may also be grasping type pick up as shown in FIG. 1(*d*2); that is, the finger part of the end effector 11 is configured to limit the displacement of the target object 12, presenting the form of "grasping" the target object 12.

In other words, the process of the robot picking up the target object may be "a-b-c-*d*1" in FIG. 1, namely, "Approach-Collision-Rotation-Non-grasping type pick up"; or it may be "a-b-c-*d*2" in FIG. 1, namely, "Approach-Collision-Rotation-Grasping type pick up".

Artificial intelligence (AI) involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. The pre-trained model, also known as a large model, or a basic model, can be widely applied to downstream tasks in various directions of AI after fine tuning. AI software technologies mainly include several major directions such as a computer vision (CV) technology, a speech processing technology, a natural language processing technology, and machine learning/deep learning.

With the development of AI technologies, AI technologies have been researched and applied in various fields, such as smart homes, smart wearable devices, virtual assistants, smart speakers, smart marketing, unmanned driving, autonomous driving, drones, robots, intelligent medical care, intelligent customer service. It is believed that AI technologies will be applied in more fields and play an increasingly important value.

In order to further improve the dexterous manipulation capability of the robot, the embodiments of the present disclosure provide a complete dynamic pick-up process to realize smooth pick-up of a target object by the end effector of the robot. This process includes a phase of approaching the target object, a phase of colliding with the target object, a phase of allowing the target object to rotate about the collision point until the end effector picks up the target object (non-grasping type pick up) or grasps the target object with a finger part of the end effector (grasping type pick up). According to dynamics of articulated bodies based on space vectors, the embodiments of the present disclosure deduce a unified model of such hybrid dynamic operation process. The model is embodied as approach-collision-rotation-non-grasping type pick up/grasping type pick up. Then, the whole process is formulated as a free terminal constrained multi-phase optimal control problem (OCP). The differential dynamic programming (DDP) is extended to solve this free terminal OCP problem, where the backward path of DDP involves the constrained quadratic programming (QP) problem, and the primal dual augmented Lagrangian (PDAL) method is used to solve the problem. The effectiveness of the method in the robot dynamically picking up a target object is verified through simulation and experiment.

According to the method provided in the embodiments of the present disclosure, each step may be executed by a robot, which refers to an electronic device having capabilities such as data calculation, processing, and storage. The robot may be a quadruped robot, a biped robot, a wheel-legged robot, a robotic arm (robotic hand), or the like. The robot provided by the embodiments of the present disclosure may be applied to scenes such as industry (for example, an industrial robot), service (for example, a serving robot), entertainment (for example, a performance robot), and medical treatment (for example, a medical robot), which are not limited herein.

The solution provided by the embodiments of the present disclosure relates to technologies such as AI-based automatic control, and can realize control of the robot. The details are described by the following embodiments.

Referring to FIG. 2, it shows a flowchart of a robot control method according to an embodiment of the present disclosure. This embodiment is described by using an example in which the method is applied to the above-mentioned robot. The method may include the following steps (step 210 to step 230):

Step 210: Control an end effector of a robot to collide with a target object in a process of the end effector of the robot moving to the target object.

In the embodiments of the present disclosure, the robot is an intelligent machine capable of performing semi-automatic or automatic operations. The robot is able to perform tasks such as work and movement through programming and automatic control. The robot may be a humanoid controlled machine (for example, a humanoid robot including a head, a body, arms, and legs), or may be a controlled robotic hand, or may be in other form, which is not limited herein.

In the embodiments of the present disclosure, the robot moving to the target object may refer to that only a part (including the end effector) of the robot moves to the target object while the other parts of the robot stay sill or move in other directions. For example, only an arm part of a humanoid robot moves to the target object while the other parts of the humanoid robot such as the legs or the head stay still. The robot moving to the target object may also refer to that each part of the robot moves to the target object; that is, the robot moves to the target object as a whole. For example, a wheeled robot or a wheel-legged robot moves to the target object as a whole, and certainly, the end effector moves. For the robot, the end effector is always in the motion state regardless of whether the other parts move.

In the embodiments of the present disclosure, the end effector is located at an end portion of the robot. The end effector is configured to perform tasks, such as installation, handling, polishing, painting, drawing, detection. The robot may be provided with different end effectors according to different tasks. Exemplarily, the end effector may be an end two-finger gripper, configured to perform repetitive motion tasks such as object grasping and handling. The end effector is controlled to move to the target object, and as a result, the end effector will contact and collide with the target object, as shown in FIG. 1(a) and FIG. 1(b). The target object is an object to be picked up.

Step 220: Control the end effector to rotate relative to the target object, to adjust the target object to a target pose suitable for the end effector to pick up.

The target pose refers to a pose of the target object when the target object maintains surface contact with the palm part of the end effector. The robot may acquire a real-time pose of the target object by a sensor, and determine that the target object has been adjusted to the target pose.

In the embodiments of the present disclosure, after the end effector of the robot collides with the target object, a motion parameter (such as a displacement, a speed, an acceleration) and an attitude of the end effector may be controlled to allow relative rotation between the end effector and the target object. In the embodiments of the present disclosure, in the relative rotation process, the angle between the target object and the end effector becomes smaller (as shown in FIG. 1(c)), such that the target object rotates relative to the end effector and finally falls on the end effector. The target pose may refer to that the target object maintains the surface contact with the end effector, and the contact surface is horizontal or slightly inclined (an inclination angle is relatively small), such that the end effector can hold the target object through the contact surface, which is convenient for the end effector to pick up the target object.

In the embodiments of the present disclosure, in order to allow that the end effector rotates relative to the target object, rather than the end effector pushes the target object to move without relative rotation, the position where the end effector initially contacts and collides with the target object is located below the centroid of the target object.

In the embodiments of the present disclosure, the position where the end effector collides with the target object is located at the bottom of the target object, such that the target object falls toward the end effector. In the embodiments of the present disclosure, in the process of the target object falling over, the end effector is controlled to rotate in a direction opposite to the falling direction.

Exemplarily, with reference to FIG. 1, the target object 12 in FIG. 1 is strip-shaped, and the position where the end effector 11 collides with the target object 12 is at the bottom of the target object 12, such that the upper half of the target object 12 falls in the direction toward the position of the end effector.

In some embodiments, in the moving process, a transverse central axis of the end effector is perpendicular to a longitudinal central axis of the target object, such that, when the end effector collides with the target object, the included angle between the two is a right angle.

Step 230: Control the end effector to pick up the target object after the target object is adjusted to the target pose.

The end effector is in motion during an entire phase from the end effector colliding with the target object to the end effector picking up the target object. For example, the robot keeps moving during the entire phase. The entire phase includes a collision phase, a rotation phase, and a pick-up phase. The end effector picks up the target object in the motion state. In some embodiments, the entire phase further includes an approach phase prior to the collision phase.

In the embodiments of the present disclosure, the end effector picking up the target object refers to that the end effector is controlled to realize that the target object remains stationary relative to the end effector without moving away from the end effector. The mode in which the end effector picks up the target object includes the non-grasping type pick up and the grasping type pick up.

In the embodiments of the present disclosure, the pick-up mode, as shown in FIG. 1(d1), is the non-grasping type pick up. The non-grasping type pick up refers to that the target object is held by the palm part of the end effector, and a static friction force based on a bearing surface of the end effector allows the target object and the end effector to remain relatively stationary. In the embodiments of the present disclosure, when the bearing surface is parallel to the horizontal plane, and both the end effector and the target object are static or move at the same constant speed, the static friction force between the target object and the end effector may be zero. For the non-grasping type pick up, after the target object is adjusted to the target pose, the end effector is controlled to allow the target object to maintain the target pose, completing the non-grasping type pick up of the target object. This pick-up mode is relatively simple and has a low requirement on the shape of the end effector (the end effector only needs to have an upward plane to carry the target object), thereby saving the manufacturing cost of the robot. Moreover, due to the low restriction on the shape of the end effector (the non-grasping type pick up can be carried out with or without the finger part), this pick-up mode has a broader application range.

In the embodiments of the present disclosure, the pick-up mode, as shown in FIG. 1(d2), is the grasping type pick up. The grasping type pick up refers to that the finger part of the end effector is closed to the palm part, to grasp the target object between the palm part and the finger part. That is, the finger part of the end effector grasps the target object to allow the target object and the end effector to remain relatively stationary. For the grasping type pick up, after the target object is adjusted to the target pose, the finger part of the end effector is closed to grasp the target object. After the grasping type pick up is completed, the target object may be in various possible attitudes. For example, the target object may be in an upright attitude or an even upside-down attitude, without escaping from the end effector. This allows the end effector and the target object to have more flexible and free poses after the grasping type pick up is completed.

To sum up, in the technical solution provided by the embodiments of the present disclosure, the end effector of the robot is controlled to move to the target object and collide with the target object in the moving process, such that the end effector rotates relative to the target object until the target object is adjusted to the target pose, and then the end effector is controlled to pick up the target object. The end effector is in motion during the pick-up process. The end effector does not need to reduce its speed to 0 and can pick up the target object in the motion state, realizing dynamic object pick-up. This saves the time required for picking up the object, thereby improving the control efficiency of the robot in picking up the object.

Moreover, the method provided by the embodiments of the present disclosure uses two strategies for dynamic pick up (namely, the grasping type pick up and the non-grasping type pick up) to achieve the dynamic pick up of the target object.

In some embodiments, the robot control method further includes: obtaining, based on a unified equation of state corresponding to a hybrid system including the end effector and the target object, pose information and force information of the hybrid system at each time step of the entire phase; and controlling the end effector at each time step of the entire phase according to the pose information and the force information of the hybrid system at each time step of the entire phase. The unified equation of state refers to an equation for describing a state of the hybrid system. The time step refers to a time span of each phase divided from the entire phase. The pose information refers to position information and attitude information of the hybrid system, as well as position information and attitude information the end effector and the target object in the hybrid system. The force information refers to information of each force in the hybrid system.

In the embodiments of the present disclosure, the pose information and the force information of the hybrid system at each time step of the entire phase meet the following constraint conditions: an inequality constraint condition, configured to constrain a friction force at a contact position between the end effector and the target object; and an equality linkage constraint condition, configured to constrain a motion trajectory and an acting force between the end effector and the target object.

In the embodiments of the present disclosure, the entire phase is divided into N time steps, where N is a positive integer. The attitude of the hybrid system is defined as $x_{ro}=[x_r\ x_o]$, where the attitude of the end effector is defined as $$x_r = \left[r_{B_r}^T, \Omega_{B_r}^T\right],$$

the attitude of the target object is defined as $$x_o = \left[r_{B_o}^T, \Omega_{B_o}^T\right], r_{B_r}^T$$

represents a centroid vector of the end effector in the world coordinate system, $$\Omega_{B_r}^T$$

represents an attitude of the end effector in the world coordinate system, $$r_{B_o}^T$$

represents a centroid vector of the target object in the world coordinate system, and $$\Omega_{B_o}^T$$

represents an attitude of the target object in the world coordinate system, $x_r$, $x_o \in \mathbb{R}^6$, $x_{ro} \in \mathbb{R}^{12}$. In addition, $$x = [x_{ro}\ \dot{x}_{ro}]$$

and $$u = \left[\hat{f}_r, \hat{f}_o\right]$$

are used to represent a general state and an input of the hybrid system, where $x_{ro}$ is used to represent pose information of the hybrid system, $\dot{x}_{ro}$ is used to represent velocity information of the hybrid system, $$\hat{f}_r$$

represents a driving force received by the end effector, and $$\hat{f}_o$$

represents a force applied to the target object by the end effector. The vector in the form of $$'\hat{t}'$$

is a spatial vector, $t_m=$ $$\left[t_m^{[1]}, \dots, t_m^{[N_s]}\right],$$

$N_s$ is used to represent that the hybrid system has $N_s$ phases, $t_m$ is used to represent a time vector of the $N_s$ phases of the hybrid system, m may be 0 or f, and the subscripts "0" and "f" represent a start time and an end time of each phase, respectively. Therefore, the unified equation of state in a discrete form can be derived as follows:

$$\begin{cases} x_{n+1} = f(x_n, |u_n, \Delta t), n = 0, 1, 2, \dots, N-1 \\ h_n(x_n, u_n) \le 0, n = 0, 1, 2, \dots, N \\ g_n(x_n, u_n) = 0, n = 0, 1, 2, \dots, N \end{cases} \tag{1}$$

$$N = \sum_{i=1}^{N_s} N^{[i]} \cdot N^{[i]}$$

is a discrete value of the $i^{th}$ phase. $x_{n+1}=f(x_n, |u_n, \Delta t)$ is a discrete form of a state space representation, $x_n$ is the pose information of the hybrid system at each time step of the entire phase, $u_n$ is the force information of the hybrid system at each time step of the entire phase, and $\Delta t$ is a step size of time (namely the foregoing "time step"). $h_n(x_n, u_n)$ is the inequality constraint condition, namely a friction cone constraint at the adhesion point between the end effector and the target object. $g_n(x_n, u_n)$ is the equality linkage constraint condition.

In the embodiments of the present disclosure, the motion trajectory $\zeta_\kappa(t)$ of the hybrid system may be described as follows:

$$\begin{cases} \zeta_\kappa(t) = \left[\zeta_\kappa^P(t)\zeta_\kappa^\Omega(t)\right]^T \in \mathbb{R}^{18} \\ \zeta_\kappa^P(t) = \left[r_\kappa^T(t)\dot{r}_\kappa^T(t)\ddot{r}_\kappa^T(t)\right]^T \in \mathbb{R}^9 \\ \zeta_\kappa^\Omega(t) = \left[\Omega_\kappa^T(t)\omega_\kappa^T(t)\dot{\omega}_\kappa^T(t)\right]^T \in \mathbb{R}^9 \end{cases} \quad (2)$$

The superscripts P and $\Omega$ represent the position and the attitude, respectively. $\kappa$ is the point $B_r$, the point $C_r$, the point $B_o$, or the point Co shown in FIG. 3(a) to FIG. 3(d). $g_n(x_n, u_n)$ represents the equality linkage constraint condition, including a kinematic connection condition and a force connection condition. The kinematic connection condition is a relationship between $\zeta_{C_r}$ and $\zeta_{C_o}$. The force connection condition is a relationship between $$\hat{f}_r$$

and $$\hat{f}_o.$$

In the embodiments of the present disclosure, the hybrid system is modeled based on DDP, and the following unified equation of state is used to describe the entire phase of the hybrid system:

$$\begin{cases} \min J = \sum_{i=1}^{N_s} \sum_{k=0}^{N^{[i]}-1} l^{[i]}\left(x_k^{[i]}, u_k^{[i]}\right) + l_f^{[i]}\left(x_N^{[i]}, t_N^{[i]}\right) \\ \text{s.t: } x_{k+1}^{[i]} = f\left(x_k^{[i]}, u_k^{[i]}\right), u_{min}^{[i]} < u^{[i]} < u_{max}^{[i]} \\ \quad g^{[i]}\left(x_k^{[i]}, u_k^{[i]}\right) = 0 \\ \quad h^{[i]}\left(x_k^{[i]}, u_k^{[i]}\right) \leq 0 \\ t_N^{[i]} \text{ is free, } t_{min}^{[i]} \leq t^{[i]} \leq t_{max}^{[i]} i = 1, 2, \ldots, N_i \end{cases} \quad (3)$$

J is an objective function, $$t_N^{[i]} = t_f^{[i]} - t_o^{[i]}$$

is a relative end time of the $i^{th}$ phase, $$t_f^{[i]}$$

is an absolute end time of the $i^{th}$ phase, $$t_o^{[i]}$$

is an absolute start time of the $i^{th}$ phase, $$t_N = \left[t_N^{[i]}, \ldots, t_N^{[N_s]}\right] \cdot l^{[i]} = \tilde{x}_k^{[i],T} Q \tilde{x}_k^{[i]} + u_k^{[i],T} R u_k^{[i]}, l_f^{[i]}\left(x_N^{[i]}\right) = \tilde{x}_N^{[i],T} Q_f \tilde{x}_N^{[i]}$$

are a trajectory objective function (trajectorycost) and a terminal objective function (terminalcost), respectively.

$$\tilde{x}_k^{[i]} = x_k^{[i]} - x_g^{[i]}$$

represents a status error, and $$x_g^{[i]}\left(t_m^{[i]}\right)$$

is an expected value.

In the embodiments of the present disclosure, obtaining, based on the unified equation of state corresponding to the hybrid system, the pose information and the force information of each time step of the entire phase of the hybrid system includes: constructing an objective function based on a Bellman optimal equation, the unified equation of state and the constraint conditions; and solving the objective function using the PDAL method, to obtain the pose information and the force information of the hybrid system at each time step of the entire phase.

In the embodiments of the present disclosure, Q, R, and $Q_f$ are weight matrices. Based on DDP, $u_k$ is exported sequentially backward. Since the above multi-constraints are solved by the PDAL method, the Bellman recursion equation can be rewritten as:

$$\hat{V}(x_n) = \min_{u_n, \lambda_E, \lambda_I} \hat{Q}(x_n, u_n, \lambda_E, \lambda_I) = \min_{u_n, \lambda_E, \lambda_I} \left(\hat{l}(x_n, u_n, \lambda_E, \lambda_I) + \hat{V}(x_{n+1})\right) \quad (4)$$

n=1, 2, . . . , N. $\lambda_E$ and $\lambda_I$ are Lagrange multipliers. $V(x_n)$ and $Q(x_n, u_n)$ represent a value function and an action state value function. The subscripts E and I represent an equal part and an unequal part, respectively.

$$\hat{Q}$$

and $$\hat{V}$$

are modified values. In addition, $\iota_{g_n}(\lambda_E)$ and $\iota_{h_n}(\lambda_I)$ are expressed as constraint-dependent trajectory costs, then, $$\hat{l}(x_n, u_n, \lambda_E, \lambda_I)$$

can be expressed as:

$$\hat{l}(x_n, u_n, \lambda_E, \lambda_I) = l_n + \mu_E l_{g_n}(\lambda_E)/2 + \mu_I l_{h_n}(\lambda_I)/2 \tag{5}$$

$$l_{g_n}(\lambda_E) = \|g_n/\mu_E + \lambda_E'\|^2 + \|g_n/\mu_E + \lambda_E' - \lambda_E\|^2 \tag{6}$$

$$l_{h_n}(\lambda_I) = \|[h_n/\mu_I + \lambda_I']_+\|^2 + \|[h_n/\mu_I + \lambda_I' - \lambda_I]_+\|^2 \tag{7}$$

$\mu_E$ and $\mu_I$ are positive scalars. $\lambda_E$ and $\lambda_I$ represent Lagrange multipliers. The superscript ' represents an updated value; $[\bullet]_+$ represents an orthogonal projection operator; $[\bullet]$ represents an active set inequality constraint; and an optimal descent direction of the quantum b may be adopted:

$$K\begin{bmatrix} \delta u \\ \delta x \\ \delta \lambda \\ [\delta v]_A \end{bmatrix} = \begin{bmatrix} \hat{Q}_u + \hat{Q}_{ux}\delta x \\ \hat{Q}_x + \hat{Q}_{xx}\delta x \\ f + f_x \delta x + \mu_E(\lambda_I - \lambda) \\ [h + h_x \delta x + \mu_I(\lambda_I - \lambda)]_A \end{bmatrix} \text{ and} \tag{8}$$

$$K = \begin{bmatrix} \hat{Q}_{uu} & \hat{Q}_{ux} & f_u^T & [h_u^T]_A \\ \hat{Q}_{xu} & \hat{Q}_{xx} & f_x^T & [h_x^T]_A \\ f_u & f_x^T & -\mu_E'E & 0 \\ [h_u]_A & [h_x]_A & 0 & -\mu_I'E \end{bmatrix} \tag{9}$$

$\xi_{\varrho,\zeta}$ is a Hessian matrix of $\zeta$ relative to $\varrho$ and $\zeta$. $\xi_\varrho$ is a Jacobian matrix of $\xi$ relative to $\varrho$. K is a Karush-Kuhn-Tucker (KKT, a necessary condition for an optimal solution of nonlinear programming) matrix. Then, optimal increment values $\delta u$, $\delta x$, $\delta \lambda$, and $\delta \mu$ are obtained, and the estimated value function is expanded by using the second-order Taylor.

$$\Delta \hat{V}(x_N, t_N) \approx \tag{10}$$
$$\hat{V}_x \delta x + \hat{V}_t \delta t + \frac{1}{2}\delta x^T \hat{V}_{xx}\delta x + \frac{1}{2}\delta x^T \hat{V}_{xt}\delta t + \frac{1}{2}\delta t^T \hat{V}_{tx}\delta x + \frac{1}{2}\delta t^T \hat{V}_{tt}\delta t$$

The first-order optimality condition can be used to derive $$\delta t_N^*$$

when the terminal is optimal:

$$\delta t_N^* = -\hat{V}_{t_N t_N}^{-1}\left(\hat{V}_{t_N} + \hat{V}_{t_N x_N}\delta x_N\right) \tag{11}$$

In the foregoing implementations, each phase in the entire phase can be uniformly expressed as the state equation (1) and the state equation (2), such that the state equations in different phases can be expressed in a unified manner. The unified input variables and control variables can be used in each phase, realizing that a unified model is applicable to different phases. There is no need to model in different phases, which reduces modeling costs and operation costs, thereby improving the modeling efficiency and the control efficiency of the robot. An algorithm based on differential dynamic programming is used to solve a fixed-order multi-phase task. The differential dynamic programming is extended to simultaneously compatible with free terminals, multi-constraints, and multi-phase tasks.

In some embodiments, controlling the end effector of the robot to collide with the target object includes the following steps:

1. Obtain a change amount of a contact velocity between the end effector and the target object before and after the collision of the end effector and the target object; where the contact velocity is a relative velocity of a contact point between the end effector and the target object.

2. Determine a velocity of the target object after the collision according to the change amount and a velocity of the target object before the collision.

3. Determine a velocity that the end effector needs to reach before the collision, according to the velocity of the target object after the collision, a maximum acceleration of the end effector, and a constraint relationship between the velocity of the target object after the collision and the velocities of the end effector before and after the collision.

4. Control the end effector to collide with the target object according to the velocity that the end effector needs to reach before the collision.

In the embodiments of the present disclosure, when the end effector collides with the target object, there is a sudden change in the velocity of the end effector, and the target object is also accelerated due to the collision; that is, the velocities of the end effector and the target object both change due to the collision. Therefore, it is necessary to control the end effector, to allow the target object to maintain contact with the end effector without separating from the end effector after the end effector collides with the target object.

In the embodiments of the present disclosure, as shown in FIG. 3(a) to FIG. 3(d), $B_j$ is the center of mass of the object j, j=r or o, representing the center of mass of the end effector or the target object.

$$\hat{I}^A$$

is a spatial inertia of the end effector-the target object (simplified to a joint body A). $m_j$ and $\sigma_j$ are the mass and the inertia of the target object j, respectively.

$$\hat{I}_j$$

$\in \mathbb{R}^6$ and $$\hat{f}_j$$

$\in \mathbb{R}^6$ are a space inertia and a space force vector of the target object j, respectively. $r_{B_j}$ is a position vector of the point $B_j$. S is a joint axis. In FIG. 3(b) to FIG. 3(d), $C_{r,i}$ and $C_{o,i}$ are contact point pairs, where i=1, 2, 3, 4. $p_j$ is an equivalent contact point of the joint body, and also an action pint of $$\hat{f}_j \cdot r_o$$

is a vector of $B_o$ to $P_o$.

$$\hat{f}_{C,i}$$

$\in \mathbb{R}^3$ is a contact force acting on the point $C_{o,i}$, {w} is the inertial system. {b} is the object conjoined coordinate system (namely, the coordinate system of the hybrid system including the end effector and the target object).

As shown in FIG. 3(b), in the collision phase, the contact points between the end effector and the target object may be considered as $C_{o,1}(C_{r,1})$ and $C_{o,2}(C_{r,2})$, and the mass and the inertia of the robot are assumed to be ∞. Therefore, the speed of the robot $r_{c_r}$ does not change in a short period of time. $\rho$ is used to represent an actual exchange momentum of the energy loss, since a general collision includes a compression phase and a recovery phase. When W is called an inverse inertia matrix, the change in the contact velocity $$v = \dot{r}_{P_o} - \dot{r}_{P_r}$$

may be defined as:

$$\Delta v = \Delta \dot{r}_{P_o} - \Delta \dot{r}_{P_r} = W(m_o, \sigma_o)\rho = W\rho. \quad (12)$$

Hence, in the post-collision phase:

$$\hat{v}_o^+ = \hat{v}_o^- + \Delta \hat{v}_o = \hat{v}_o^- + M\rho \quad (13)$$

M=$[1/m_o; r_o \times / \sigma_o]$ is a matrix associated with dynamic parameters. The superscripts '+' and '−' represent post-collision and pre-collision, respectively.

$$\hat{a}_{r,max}$$

is used to represent a maximum acceleration of the end effector, then $$\hat{v}_r^+ - \hat{v}_r^- = \hat{a}_{r,max}\delta t. \text{ If } \hat{v}_0^+ < \hat{v}_r^-,$$

the end effector and the target object will stick all the time; if $$\hat{v}_r^- < \hat{v}_0^+ < \hat{v}_r^+,$$

the end effector needs to be accelerated to stick to the target object all the time. if $$\hat{v}_0^+ > \hat{v}_r^-,$$

the end effector and the target object are separated. The collision point may be selected from $A_o$, $B_o$, and $C_o$. The edge of the palm part of the end effector collides with the point $C_o$, so that the object can be removed in time from the current object (such as a table), which reduces the friction uncertainty. An appropriate selection in the pick-up point makes the dynamic pick-up task more deterministic.

In the foregoing implementations, the end effector is controlled, to make the target object maintain contact with the end effector without separation after the collision, thereby providing a guarantee for the pick-up phase.

In the embodiments of the present disclosure, as shown in FIG. 3(c), in the rotation phase, the number of contact points between the end effector and the target object $N_c$=2, $C_r$=$C_{r,}$ $_1 \cup C_{r,2}$. The two-point contact cannot fully constrain the object (namely, the target object), so the target object is able to rotate. Therefore, the equality constraints of the motion spectrum condition and the force spectrum condition may be described as:

$$\zeta_{C_{r,i}}^P = R_{B_r}^{C_{r,i}}\zeta_{B_r}^P = \zeta_{C_{o,i}}^F = R_{B_o}^{C_{o,i}}\zeta_{B_o}^P, \; i = 1, \dots, N_c \quad (14)$$

$$\left(\hat{E} - \hat{I}_r \hat{I}^{A,-1}\right)\hat{f}_r - \hat{f}_o + \hat{I}_r \hat{I}^{A,-I}\hat{p}^A + \hat{p}_r = 0 \quad (15)$$

$$R_{B_{j,i}}^{C_{j,i}}$$

is a transformation matrix of $$\zeta_{B_j}^P$$

to $$\zeta_{C_{j,i}}^P,$$

j=r or o; and E is an identity matrix. In general, this equation can be expressed as an equation constraint of g(x, u). In addition, for the target object, a force spiral (such as a resultant force and a resultant moment) w$\in \mathbb{R}^6$ at the center of mass, a net force vector $$\hat{f}_0$$

$\in \mathbb{R}^6$, and a contact force $f_C \in \mathbb{R}^{N_c \times 3}$ are related as follows:

$$w = T\hat{f}_o = G_r f_C, \; j = 1, \dots, N_c \quad (16)$$

T is a spatial transformation matrix, $G_r$ is a grasp transformation matrix. In addition, the friction cone constraint $h(x, u)$ can ensure the relative rotation of the end effector and the target object, and it may be expressed as follows:

$$N_i^T f_{C,i} \le b_i \qquad (17)$$

$N_i = -[\mu_i n_i - o_i, \mu_i n_i o_i, \mu_i n_i - t_i, \mu_i n_i t_i, n_i - n_i]$, $N_i \in \mathbb{R}^{3\times6}$. $\mu_i$ is a Coulomb coefficient of friction, $$b_i^j = [0, 0, 0, 0, -f_{C,i}^L, -f_{C,i}^R] \cdot n_i$$

is a unit normal vector, and $o_i, t_i \in \mathbb{R}^3$ are two orthogonal tangent vectors for describing the hybrid system.

$$f_{C,i}^L, f_{C,i}^R$$

are a non-negative lower bound and an upper bound of a normal contact force, respectively. The dynamic non-driven rotation is subject to one-way constraint, which continuously increases the energy of the end effector. Therefore, the boundary conditions of the hybrid system need to meet this requirement.

The constraint conditions of the pick-up phase are almost the same as those of the rotation phase, other than that the number of the contact points is changed to be $N_c=4$, $C_r = C_{r,1} \cup C_{r,2} \cup C_{r,3} \cup C_{r,4}$. The four-point surface contact completely limits the movement of the target object such that the target object rests on the palm part of the end effector. Therefore, the non-grasping type pick up and the grasping type pick up have the same motion spectrum and force spectrum of the equality constraint $g(x, u)$. A main difference between the non-grasping type pick up and the grasping type pick up lies in that the non-grasping type pick up needs the friction constraint, while the grasping type pick up does not need the friction constraint. In the process of the grasping type pick up, the finger part of the robot needs to be closed, to form a multi-directional displacement limit with the palm part for grasping the target object. After the finger part is closed, the end effector has the same linear and angular velocities as the target object, so the velocity of the target object needs to be removed. After this, the target object is moved to a specific position and attitude. The configuration of the non-grasping type pick up is shown in FIG. 1(d1). Different from the grasping type pick up, the non-grasping type pick up utilizes dynamic balance during the movement of the target object, to make the target object adhere to the palm part and maintain contact with the palm part. The contact force between the palm part and the target object needs to always meet the friction cone constraint, so the inequality constraint $h(x, u)$ needs to be considered.

In the embodiments of the present disclosure, as shown in the figure, the DDP-based optimization framework includes two main parts: forward propagation and backward propagation. The backward channel is formulated as a constrained QP problem, which is solved by using the PDAL method. The modified constrained DDP is as follows:
Given $$x0, xg, xn1 = f(xn, un), g(xn, un), h(xn, un)//$$
$$\text{Given } x0, xg, xn+1, g(xn, un), h(xn, un)$$

Initialization $$U = \{u0, u1, \ldots, uN-1\}, X = \{x0, x1, \ldots, xN\}//$$
$$\text{Initialize } U, X \text{ and } n_n$$

$n_n = 0$, //Iteration counter while $(|Jn - Jn - 1| \ge \epsilon)$ do //When $|Jn - Jn - 1| \ge \epsilon$ $$\hat{V}_{x_N}, \hat{V}_{x_N x_N}, \hat{V}_{t_N}, \hat{V}_{t_N x_N}, \hat{V}_{t_N t_N}$$

for k=N−1 to 0 do //Start looping from k=N−1 to k=0
    Calculation of Jacobian and Hessian matrix Then the optimal incremental value, $\delta u$, $\delta x$, $\delta \lambda$, $\delta \mu$ //Calculate the optimal incremental values $\delta u$, $\delta x$, $\delta \lambda$, $\delta \mu$ of the Jacobian and Hessian matrix
end for
for n=0 to N−1 do //Start looping from k=0 to k=N−1

$$u_n' = u_n + \delta u_n$$
$$x_{n+1} = f(x_n, u_n')$$

end for
$\delta t_N \leftarrow$ Eq.17//Update $\delta t_N$ with the calculation result of formula (17)

$$t_N = \min(\max(t_N + \delta t, t_{min}), t_{max})$$

$$N' = N + \delta t_N / \Delta t$$

$$J \leftarrow J', X \leftarrow X', U \leftarrow U', n_n \leftarrow n_n + 1, N \leftarrow N'//\text{Update } J, X, U,$$
$$n_n, N$$

end while=0
$\epsilon$ is a given decimal, the superscript ' represents an updated value, X is a state sequence, and U is a control input sequence.

Assuming that two objects (as shown in FIG. 1) are in contact, the dynamics based on the space vector can be derived as:

$$\hat{f}_r = \hat{I}^A \hat{a}_r + \hat{p}^A = \hat{I}_r \hat{a}_r + \hat{p}_r + f_o \qquad (18)$$

$$\hat{f}_o = \hat{I}_o \hat{a}_o + \hat{p}_o \qquad (19)$$

$$\hat{a}_o = \hat{a}_r + \Delta \hat{a} \qquad (20)$$

$$\hat{a}_j \in \mathbb{R}^6, \hat{p}_j \in \mathbb{R}^6$$

are the acceleration and the deflection force of the object j. $\hat{p}^A \in \mathbb{R}^6$ is the deflection force of the articulated object A, and $\Delta \hat{a}$ is the relative acceleration.

According to the contact state and the motion state of the dual-body system, there may be the following three cases:

Case One: The end effector r is separated from the target object o.

$$\hat{l}^A = \hat{l}_r, \; \hat{p}^A = \hat{p}_r \cdot \hat{f}_r$$

and $$\hat{f}_o$$

are independent of each other, $$\hat{f}_o = 0.$$

Case Two: The end effector r is in contact coupling with the target object o, and there is a relative motion.

$$\hat{l}^A = \hat{l}^A(\hat{l}_r, \hat{p}_r, \hat{s}, \hat{l}_o, \hat{p}_o), \; \hat{p}^A = \hat{p}^A(\hat{l}_r, \hat{p}_r, \hat{s}, \hat{l}_o, \hat{p}_o) \cdot \hat{f}_r$$

and $$\hat{f}_o$$

are interdependent, and are coupling force vectors. $\hat{a}_r$ and $\hat{a}_o$ are interdependent, $\Delta \hat{a} \neq 0$.

Case Three: The end effector r is in contact coupling with the target object o, and there is no relative motion (no adhesive contact). In this case, the kinematics and dynamics of the two objects are roughly the same as those of the two objects in Case Two, but $\Delta \hat{a} = 0$.

Considering $$\dot{x}_{ro} = [\hat{a}_r, \hat{a}_o], \; x = [x_{ro}, \dot{x}_{ro}], \; u = \left[\hat{f}_r, \hat{f}_o\right],$$

a unified differential equation can be obtained:

$$x = F(x, u) = Ax + Bu + C \tag{21}$$

A, B, and, C are system matrices, $$A = [0, E; 0, 0], \; B = \left[0, 0; \hat{l}^{A,-1}, 0; 0_G \hat{l}_o^{-1}\right], \; C = \left[0; \hat{l}^{A,-1}\hat{p}^A; \hat{l}_o^{-1}\hat{p}_o\right].$$

In the present disclosure, the approach phase belongs to Case One, the rotation phase belongs to the Case Two, and Case Three can be applied to the grasping type pick up or the non-grasping type pick up. The hybrid system model based on a six-dimensional vector is more concise than a general three-dimensional vector.

A co-simulation of the robot control method provided by the embodiments of the present disclosure is performed by combining Recurdyn with MATLAB. The experiment relies on a dual-UR16e robot.

$$x_r = [\, x_r \quad y_r \quad \gamma_r \,], \; u_r = [f_{x_r}, f_{y_r}, f_{\gamma_r}], \; x_o = [x_o y_o \gamma_o], \; x_{ro} = [x_r x_o]$$

and $u_o = [f_{x_o} f_{y_o} f_{\gamma_o}]$. Since $x_o$ and $y_o$ of the object in this task are either fixed or constrained by the motion spectral line, in order to simplify the expression, the following table 1 shows the simplified general coordinates $\bar{x} = [x_r y_r \gamma_r \gamma_o]$.

Figure 5:
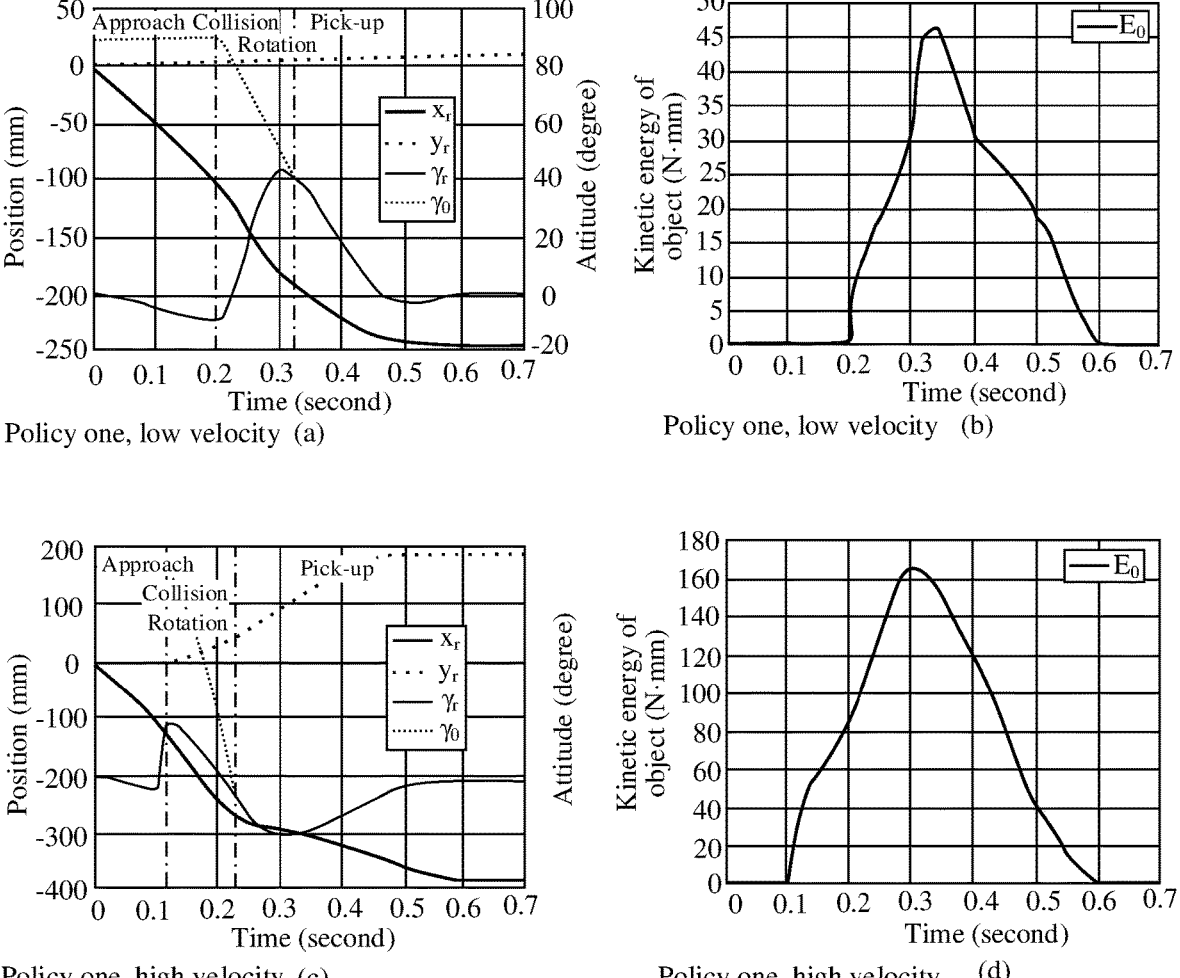
FIG. 5 is a schematic diagram of simulation results according to an embodiment of the present disclosure.
Figure 6:
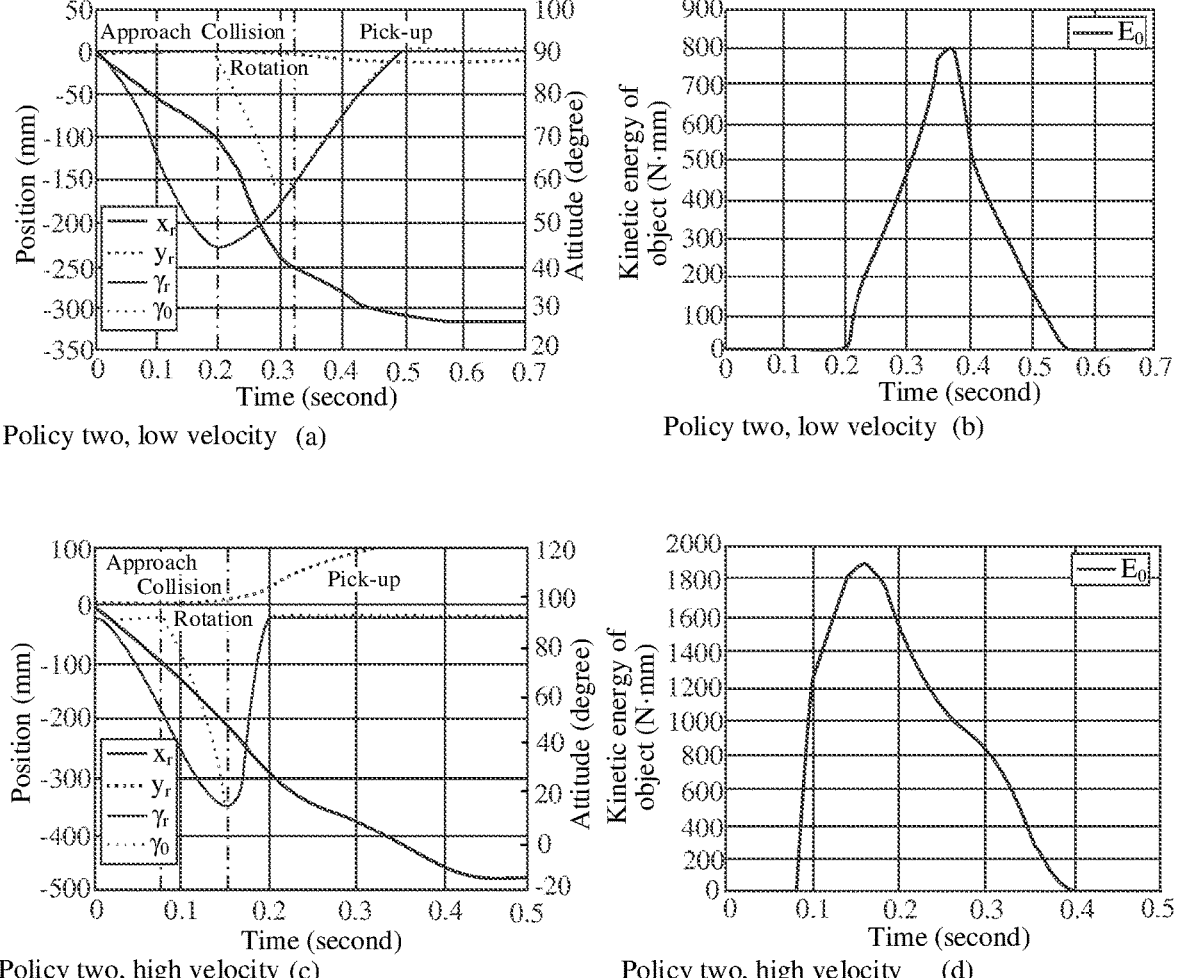
FIG. 6 is a schematic diagram of simulation results according to another embodiment of the present disclosure.

As shown in FIG. 4, the weight of the target object 12 is 0.3 kg, and the size of the target object is 12 cm×2.5 cm×5 cm. The actual coefficient of friction between the end effector and the target object is 0.55. In the simulation, FIG. 4(a) and FIG. 4(b) correspond to low and high collision velocities, respectively, and the curves of the required attitude and energy in FIG. 4(a) and FIG. 4(b) are shown in FIG. 5 and FIG. 6, respectively. Since the time of the collision process is very short (expressed as $$\left(t_f^{[2]} - t_f^{[1]}\right) \to 0\right),$$

there is no change in the attitude of the target object 12, but the target object has an instantaneous velocity.

The expected boundary conditions of the different phases are shown in Table 1:

TABLE 1

|  | Simulation policy one, low velocity | Simulation policy one, high velocity | Simulation policy two, low velocity | Simulation policy two, high velocity | Experiment one | Experiment two |
|---|---|---|---|---|---|---|
| $\bar{x}_N^{[1]}$ | [−0.1, 0, −0.15, 1.57] | [−0.1, 0, −0.15, 1.57] | [−0.1, 0, −0.785, 1.57] | [−0.1, 0, 0.87, 1.57] | [−0.1, 0, −0.35, 1.57] | [−0.1, 0, −1.13, 1.57] |
| $\bar{x}_N^{[2]}$ | [−0.1, 0, −0.15, 1.57] | [−0.1, 0, −0.15, 1.57] | [−0.1, 0, −0.785, 1.57] | [−0.1, 0, 0.87, 1.57] | [−0.1, 0, −0.35, 1.57] | [−0.1, 0, −1.13, 1.57] |
| $\bar{x}_N^{[3]}$ | [◇, ◇, 0.7, 0.7] | [◇, ◇, −0.7, −0.7] | [◇, ◇, 1.05, 1.05] | [◇, ◇, 0.28, 0.28] | [◇, ◇, −0.35, −0.35] | [◇, ◇, 0.7, 0.7] |
| $\bar{x}_N^{[4]}$ | [◇, ◇, 0, 0] | [◇, ◇, 0, 0] | [◇, ◇, 1.57, 1.57] | [◇, ◇, 1.57, 1.57] | [◇, ◇, 0, 0] | [◇, ◇, 1.57, 1.57] |
| $\dot{x}_N^{[1]}$ | [−0.5, 0, 0, 0] | [−1, 0, 0, 0] | [−0.5, 0, 0, 0] | [−1, 0, 0, 0] | [−0.6, 0, 0, 0] | [−0.8, 0, 0, 0] |
| $\dot{x}_N^{[2]}$ | [−0.5, 0, 0, −3] | [−1, 0, 0, −5] | [−0.5, 0, 0, −3] | [−1, 0, 0, −5] | [−0.6, 0, 0, −3.6] | [−0.8, 0, 0, −4.8] |
| $\dot{x}_N^{[3]}$ | [−0.8, 0.1, −5.5, −5.5] | [−1.4, 0.4, −8, −8] | [−0.8, 0.05, −5, −5] | [−1.4, 0.2, −7, −7] | [−0.8, 0.22, −5.6, −5.6] | [−1.3, 0.2, −6.8, −6.8] |
| $\dot{x}_N^{[4]}$ | [0, 0, 0, 0] | [0, 0, 0, 0] | [0, 0, 0, 0] | [0, 0, 0, 0] | [0, 0, 0, 0] | [0, 0, 0, 0] |

The symbol "◇" represents no constraint, namely a free terminal.

In the embodiments of the present disclosure, the entire phase corresponding to the non-grasping type pick up is called Policy One, and the entire phase corresponding to the grasping type pick up is called Policy Two.

With respect to the simulation of Policy One at different velocities: the end effector has a flat plate structure, and it can dynamically pick up an object without closing the finger part. This part gives the simulation results of dynamic non-grasping type pick up in low-velocity and high-velocity collision situations (distinguished by the contact velocity v). The corresponding switching time vectors are $t_f$=[0.2,0.2, 0.32,0.6] seconds and $t_f$=[0.1,0.1,0.22,0.57] seconds, respectively. The constraints of the rotation phase and the pick-up phase ensure stable contact between the palm part and the target object. According to the simulation results, using the method provided by the embodiments of the present disclosure, the robot can successfully pick up the target object at different collision velocities.

With respect to the simulation of Policy Two at different velocities: the Allegro Hand is used to achieve a mixed operation of grasping type pick up and non-grasping type pick up. This part gives the simulation results of dynamic grasping type pick up in low-velocity and high-velocity collision situations. The corresponding switching time vectors are $t_f$=[0.2,0.2,0.33,0.55] seconds and $t_f$=[0.08,0.08, 0.16,0.39] seconds, respectively. According to the simulation results, using the method provided by the embodiments of the present disclosure, the robot can successfully pick up the target object without stopping the motion of the end effector.

Figures 7, 8, 9:
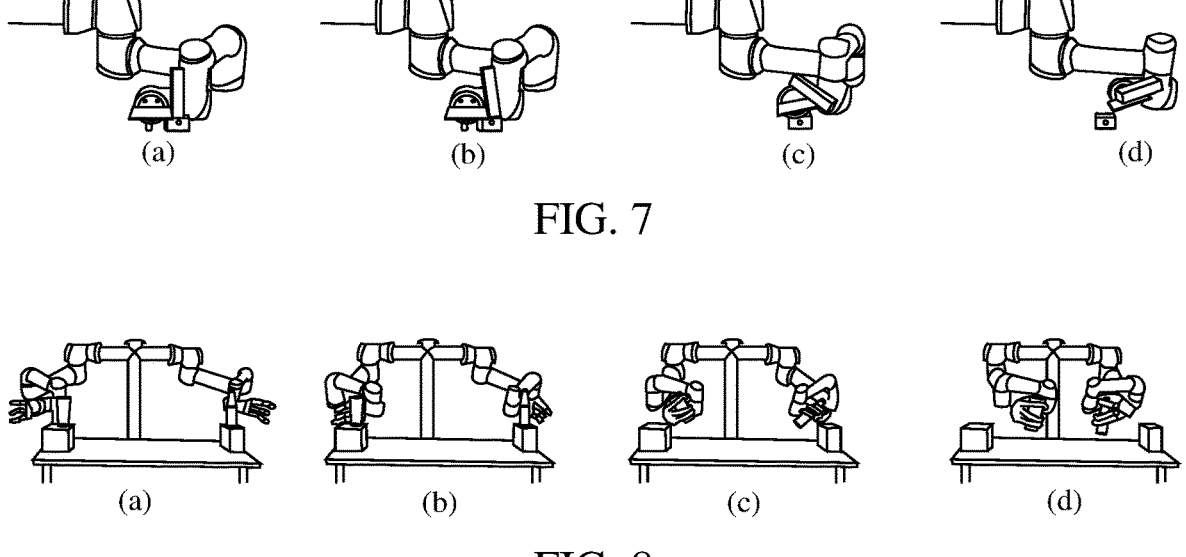
FIG. 7 is a schematic diagram of a robot control method according to another embodiment of the present disclosure.
FIG. 8 is a schematic diagram of a robot control method according to another embodiment of the present disclosure.
FIG. 9 is a block diagram of a robot control apparatus according to an embodiment of the present disclosure.

With respect to the robot experiment using Policy One: In this experiment, the target object to be picked up is a cuboid. The weight of the cuboid was 0.3 kg, and the size of the cuboid is 12 cm×2.5 cm×5 cm. The centroid of the target object is at the geometric center. The actual coefficient of friction between the palm part and the cuboid is 0.55. The corresponding switching time vector is $t_f$=[0.15,0.15,0.3, 0.5] seconds. The end effector is in a shape of a flat plate and does not decelerate when picking up the target object. By effectively unifying the dynamic operation principles of three pick-up modes, as shown in FIG. 7, it is finally realized that the palm part dynamically picks up the target object without closing the finger part. The success rate of this experiment is 90% (9/10).

With respect to the robot experiment using Policy Two: In this experiment, the dual UR16es and the Allegro Hand are used to realize the mixed operation of grasping type pick up and non-grasping type pick up, configured to dynamically picking up a large vibrating screen and a bottle. The weights of the large vibrating screen and the bottle are 0.5 kg and 0.3 kg, respectively. The actual coefficients of friction between the end effector and the two objects are 0.45 and 0.5, respectively. Assuming that the centroids of the objects are located at their geometric centers, the motion trajectory of the robot can be calculated, and the corresponding switching time vector is $t_f$=[0.2,0.2,0.35,0.52] seconds. As shown in FIG. 8, the finger part of the end effector can grip the objects (the large vibrating screen and the bottle), completing tasks such as pouring water. The success rate of this experiment is 100% (10/10).

The following describes apparatus embodiments of the present disclosure, which can be used for executing the method embodiments of the present disclosure. The details not disclosed in the apparatus embodiments of the present disclosure may refer to the method embodiments of the present disclosure.

Referring to FIG. 9, it shows a block diagram of a robot control apparatus according to an embodiment of the present disclosure. The apparatus has a function of performing the foregoing robot control method, and the function may be implemented by hardware or may be implemented by hardware executing corresponding software. The apparatus may be the above-mentioned robot, or may be disposed on the robot. The apparatus 900 may include: a collision control module 910, a rotation control module 920, and a pick-up control module 930.

The collision control module 910 is configured to control an end effector of a robot to collide with a target object in a process of the end effector moving to the target object.

The rotation control module 920 is configured to control the end effector to rotate relative to the target object, to adjust the target object to a target pose suitable for the end effector to pick up.

The pick-up control module 930 is configured to control the end effector to pick up the target object after the target object is adjusted to the target pose; where the end effector is in motion during an entire phase from the end effector colliding with the target object to the end effector picking up the target object.

In some embodiments of the present disclosure, a position where the end effector collides with the target object is located at a bottom of the target object, to allow the target object to fall toward the end effector.

In some embodiments of the present disclosure, the rotation control module 920 is further configured to control the end effector to rotate in a direction opposite to a falling direction in a process of the target object falling over.

In some embodiments of the present disclosure, a pick-up mode is non-grasping type pick up. The non-grasping type pick up refers to a pick-up mode in which the target object is held by a palm part of the end effector, and a static friction force based on a bearing surface allows the target object and the end effector to remain relatively stationary.

In some embodiments of the present disclosure, the pick-up control module 930 is further configured to control the end effector to rotate until the target object and the palm part of the end effector is relatively stationary.

In some embodiments of the present disclosure, a pick-up mode is grasping type pick up. The grasping type pick up refers to a pick-up mode in which a finger part of the end effector is closed toward a palm part of the end effector, to pick up the target object between the palm part and the finger part.

Figure 10:
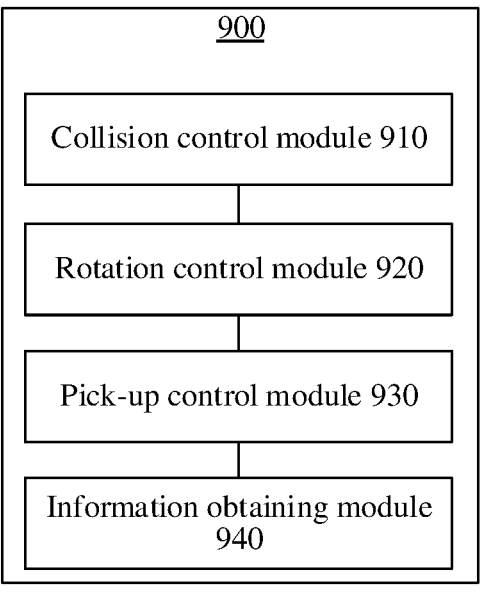
FIG. 10 is a block diagram of a robot control apparatus according to another embodiment of the present disclosure.

In some embodiments of the present disclosure, as shown in FIG. 10, the apparatus 900 further includes: an information obtaining module 940.

The information obtaining module 940 is configured to obtain, based on a unified equation of state corresponding to a hybrid system including the end effector and the target object, pose information and force information of the hybrid system at each time step of the entire phase.

The pick-up control module 930 is further configured to control the end effector at each time step of the entire phase according to the pose information and the force information of the hybrid system at each time step of the entire phase.

In some embodiments of the present disclosure, the pose information and the force information of the hybrid system at each time step of the entire phase meet the following constraint conditions:

an inequality constraint condition, configured to constrain a friction force of a contact position between the end effector and the target object; and an equality linkage constraint condition, configured to constrain a motion trajectory and an acting force between the end effector and the target object.

In some embodiments of the present disclosure, as shown in FIG. 10, the information obtaining module 940 is configured to:

construct an objective function based on a Bellman optimal equation, the unified equation of state and the constraint conditions; and solve the objective function by using the PDAL method, to obtain the pose information and the force information of the hybrid system at each time step of the entire phase.

In some embodiments of the present disclosure, the collision control module 910 is configured to:

obtain a change amount of a contact velocity between the end effector and the target object before and after a collision of the end effector and the target object, where the contact velocity refers to a relative velocity of a contact point between the end effector and the target object;

determine a velocity of the target object after the collision according to the change amount and a velocity of the target object before the collision;

determine a velocity that the end effector needs to reach before the collision, according to the velocity of the target object after the collision, a maximum acceleration of the end effector, and a constraint relationship between the velocity of the target object after the collision and the velocities of the end effector before and after the collision; and control the end effector to collide with the target object according to the velocity that the end effector needs to reach before the collision.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

To sum up, in the technical solution provided by the embodiments of the present disclosure, the end effector of the robot is controlled to move to the target object and collide with the target object in the moving process, such that the end effector rotates relative to the target object until the target object is adjusted to the target pose, and then the end effector is controlled to pick up the target object. The end effector is in motion during the pick-up process. The end effector does not need to reduce its speed to 0 and can pick up the target object in the motion state, realizing dynamic object pick-up. This saves the time required for picking up the object, thereby improving the control efficiency of the robot in picking up the object.

Figure 11:
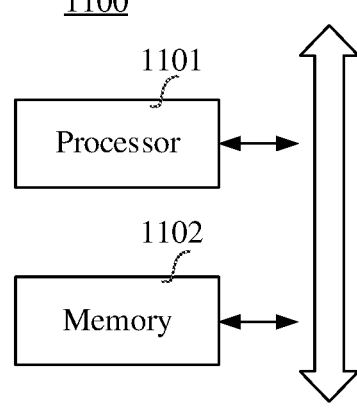
FIG. 11 is a block diagram of a robot according to an embodiment of the present disclosure.

FIG. 11 shows a structural block diagram of a robot according to an exemplary embodiment of the present disclosure. The robot 1100 may be the above-mentioned robot.

Typically, the robot 1100 includes: a processor 1101 and a memory 1102.

The processor 1101 may include one or more processing cores, for example, a 4-core processor or an 11-core processor. The processor 1101 may be implemented in at least one hardware form of a digital signal processor (DSP), a field-programmable gate array (FPGA), and a programmable logic array (PLA). The processor 1101 may also include a main processor and a co-processor. The main processor is a processor configured to process data in an awake state, and is also referred to as a central processing unit (CPU). The co-processor is a low power consumption processor configured to process the data in a standby state. In some embodiments, the processor 1101 may be integrated with a graphics processing unit (GPU). The GPU is configured to render and draw content that needs to be displayed on a display screen. In some embodiments, the processor 1101 may further include an AI processor. The AI processor is configured to process computing operations related to machine learning.

The memory 1102 may include one or more computer-readable storage media. The computer-readable storage medium may be non-transient. The memory 1102 may further include a high-speed random access memory and a nonvolatile memory, for example, one or more disk storage devices or flash storage devices. In some embodiments, the non-transitory computer-readable storage medium in the memory 1102 is configured to store a computer program. The computer program is configured to be loaded and executed by the processor 1101 to implement the robot control method provided in each method embodiment.

In an exemplary embodiment, an end effector of a robot is further provided. The end effector is configured to collide with a target object in a process of the end effector moving to the target object.

The end effector is further configured to rotate relative to the target object after colliding with the target object to adjust the target object to a target pose suitable for the end effector to pick up.

The end effector is further configured to pick up the target object after the target object is adjusted to the target pose. The end effector is in motion during an entire phase from the end effector colliding with the target object to the end effector picking up the target object.

In an embodiment of the present disclosure, the end effector includes a palm part. The pick-up mode is non-grasping type pick up. When the end effector performs the non-grasping type pick up, the target object is held by the palm part of the end effector, and a static friction force based on a bearing surface allows the target object and the end effector to remain relatively stationary.

In an embodiment of the present disclosure, the end effector includes a palm part and a finger part. The pick-up mode is grasping type pick up. When the end effector performs the grasping type pick up, the finger part of the end effector is closed towards the palm part, to grasp the target object between the palm part and the finger part.

In an exemplary embodiment, a computer-readable storage medium is provided. The storage medium stores a computer program, the computer program, when executed by a processor, implementing the foregoing robot control method.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

In an exemplary embodiment, a computer program product is further provided. The computer program product includes a computer program, the computer program being stored in a computer-readable storage medium. A processor of a robot reads the computer program from the computer-readable storage medium, and executes the computer program to cause the robot to implement the foregoing robot control method.

What is claimed is:

1. A robot control method, performed by a robot, and the method comprising:

controlling an end effector of the robot to collide with a target object in a process of the end effector moving to the target object;

controlling the end effector to rotate relative to the target object, to adjust the target object to a target pose corresponding to a pick-up action;

controlling the end effector to pick up the target object after the target object is adjusted to the target pose; wherein the end effector is in motion during an entire phase from the end effector colliding with the target object to picking up the target object;

obtaining, based on a unified equation of state corresponding to a hybrid system comprising the end effector and the target object, pose information and force information of the hybrid system at each time step of the entire phase; and controlling the end effector at each time step of the entire phase according to the pose information and the force information of the hybrid system at each time step of the entire phase.

2. The method according to claim 1, wherein a position where the end effector collides with the target object is located at a bottom of the target object, to allow the target object to fall toward the end effector.

3. The method according to claim 2, wherein the controlling the end effector to rotate relative to the target object comprises:

controlling the end effector to rotate in a direction opposite to a falling direction in a process of the target object falling over.

4. The method according to claim 1, wherein a pick-up mode of the end effector is non-grasping type in which the target object is held by a palm part of the end effector, and a static friction force on a bearing surface of the end effector allows the target object and the end effector to remain relatively stationary.

5. The method according to claim 4, wherein the controlling the end effector to pick up the target object comprises:

controlling the end effector to rotate until the target object and the palm part of the end effector is relatively stationary.

6. The method according to claim 1, wherein a pick-up mode of the end effector is grasping type in which a finger part of the end effector is closed toward a palm part of the end effector, to grasp the target object between the palm part and the finger part.

7. The method according to claim 1, wherein the pose information and the force information of the hybrid system at each time step of the entire phase meet the following constraint conditions:

an inequality constraint condition, configured to constrain a friction force of a contact position between the end effector and the target object; and an equality linkage constraint condition, configured to constrain a motion trajectory and an acting force between the end effector and the target object.

8. The method according to claim 7, wherein the obtaining, based on the unified equation of state corresponding to the hybrid system comprising the end effector and the target object, the pose information and the force information of the hybrid system at each time step of the entire phase comprises:

constructing an objective function based on a Bellman optimal equation, the unified equation of state, and the constraint conditions; and solving the objective function by using a primal dual augmented Lagrangian multiplier method, to obtain the pose information and the force information of the hybrid system at each time step of the entire phase.

9. The method according to claim 1, wherein the controlling the end effector of the robot to collide with the target object comprises:

obtaining a change amount of a contact velocity between the end effector and the target object before and after a collision of the end effector and the target object, wherein the contact velocity refers to a relative velocity of a contact point between the end effector and the target object;

determining a velocity of the target object after the collision according to the change amount and a velocity of the target object before the collision;

determining a velocity that the end effector needs to reach before the collision, according to the velocity of the target object after the collision, a maximum acceleration of the end effector, and a constraint relationship between the velocity of the target object after the collision and velocities of the end effector before and after the collision; and controlling the end effector to collide with the target object according to the velocity that the end effector needs to reach before the collision.

10. A robot control apparatus, comprising: a processor and a memory, the memory storing a computer program, and the computer program being loaded and executed by the processor to implement:

controlling an end effector of the robot to collide with a target object in a process of the end effector moving to the target object;

controlling the end effector to rotate relative to the target object, to adjust the target object to a target pose corresponding to a pick-up action;

controlling the end effector to pick up the target object after the target object is adjusted to the target pose; wherein the end effector is in motion during an entire phase from the end effector colliding with the target object to picking up the target object;

obtaining, based on a unified equation of state corresponding to a hybrid system comprising the end effector and the target object, pose information and force information of the hybrid system at each time step of the entire phase; and controlling the end effector at each time step of the entire phase according to the pose information and the force information of the hybrid system at each time step of the entire phase.

11. The apparatus according to claim 10, wherein a position where the end effector collides with the target object is located at a bottom of the target object, to allow the target object to fall toward the end effector.

12. The apparatus according to claim 11, wherein the rotation control module is further configured to control the end effector to rotate in a direction opposite to a falling direction in a process of the target object falling over.

13. The apparatus according to claim 10, wherein a pick-up mode of the end effector is non-grasping type in which the target object is held by a palm part of the end effector, and a static friction force based on a bearing surface of the end effector allows the target object and the end effector to remain relatively stationary.

14. The apparatus according to claim 13, wherein the pick-up control module is further configured to control the end effector to rotate until the target object and the palm part of the end effector is relatively stationary.

15. The apparatus according to claim 10, wherein a pick-up mode of the end effector is grasping type in which a finger part of the end effector is closed toward a palm part of the end effector, to grasp the target object between the palm part and the finger part.

16. The apparatus according to claim 10, wherein the pose information and the force information of the hybrid system at each time step of the entire phase meet the following constraint conditions:

an inequality constraint condition, configured to constrain a friction force of a contact position between the end effector and the target object; and an equality linkage constraint condition, configured to constrain a motion trajectory and an acting force between the end effector and the target object.

17. The apparatus according to claim 16, wherein the obtaining, based on the unified equation of state corresponding to the hybrid system comprising the end effector and the target object, the pose information and the force information of the hybrid system at each time step of the entire phase comprises:

constructing an objective function based on a Bellman optimal equation, the unified equation of state, and the constraint conditions; and solving the objective function by using a primal dual augmented Lagrangian multiplier method, to obtain the pose information and the force information of the hybrid system at each time step of the entire phase.

18. A non-transitory computer-readable storage medium, storing a computer program, the computer program being loaded and executed by a processor coupled to a robot to implement:

controlling an end effector of the robot to collide with a target object in a process of the end effector moving to the target object;

controlling the end effector to rotate relative to the target object, to adjust the target object to a target pose corresponding to a pick-up action;

controlling the end effector to pick up the target object after the target object is adjusted to the target pose; wherein the end effector is in motion during an entire phase from the end effector colliding with the target object to picking up the target object;

obtaining, based on a unified equation of state corresponding to a hybrid system comprising the end effector and the target object, pose information and force information of the hybrid system at each time step of the entire phase; and controlling the end effector at each time step of the entire phase according to the pose information and the force information of the hybrid system at each time step of the entire phase.

\* \* \* \* \*